N. W. NORTHRUP.
Car Wheel.
No. 36,790. Patented Oct. 28, 1862.
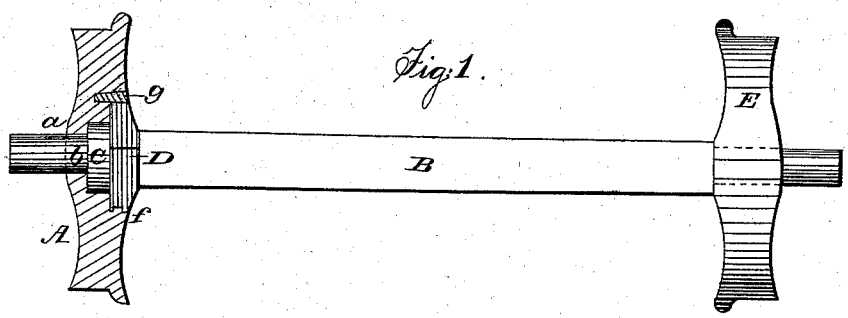
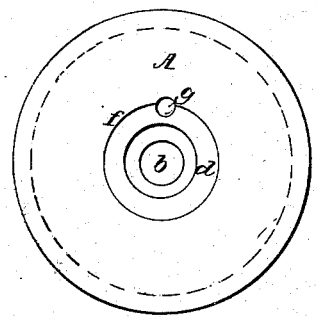
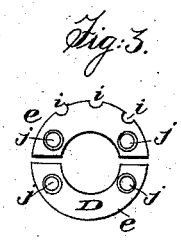
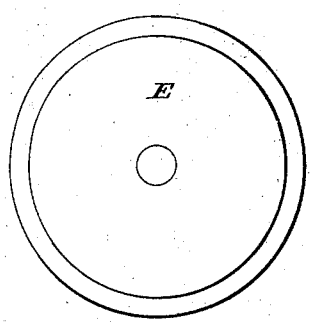
Witnesses.
Inventor.

UNITED STATES PATENT OFFICE.

NELSON W. NORTHRUP, OF GREENE, NEW YORK.

IMPROVEMENT IN COMBINED CAR-WHEEL AND CAR-AXLE.

Specification forming part of Letters Patent No. 36,790, dated October 28, 1862.

*To all whom it may concern:*

Be it known that I, NELSON W. NORTHRUP, of the town of Greene, in the county of Chenango, State of New York, have invented a new and useful Improvement in Car Wheels and Axles Combined; and I do hereby declare that the following is a clear and exact description of the same, reference being had to the accompanying drawings, making part of this specification, in which—

Figure 1 represents a section through two car wheels and axle. Fig. 2 is the inside face of the loose wheel. Fig. 3 shows the nut or follower in two parts. Fig. 4 shows the face of either car-wheel.

My invention consists in the construction and mechanical arrangement of the axle and hub of car-wheels, so as to secure them firmly in their places and allow one of them to turn on the axle, thereby saving the gathering and strain in going around curves.

To enable others skilled in the art to make and use my improvement, I will describe it more fully, referring to the drawings, and to the letters marked thereon.

I make the car-wheel A in any of the usual forms or styles, the face $a$ being complete, with its center hole only sufficient for the end of the axle B to pass through and project outside of the wheel when the supporting-rest of the car-truck is placed on the outside. The wheel A is fitted closely on the axle B, but so as to allow it to turn, one-third of the thickness of the hub $b$ bearing on the axle and against the ring or head $c$, which is about twice the diameter of the bearing $b$ and somewhat larger than the shaft of the axle B. The ring or head $c$ is of such thickness as to fill another one-third of the central portion of the hub in the car-wheel A, the same being counterbored to receive the bearing $b$ and head $c$. I then counterbore the inside face of the wheel A still larger than the part that covers the ring or head $c$ on the axle, and cut a screw-thread, $f$, the depth of the last chamber, $d$, into which is fitted a follower or nut, D, having a screw-thread, $e$, to fit the female screw $f$ in the chamber $d$. The follower or nut D is made in two parts, as seen in Fig. 3, for the purpose of allowing it to tighten on the axle B and head $c$. Should there be wear enough to loosen the wheel on the bearing, by the nut D being in halves it would admit of the car-wheel being removed and another substituted in its place without removing the other wheel or axle from the truck, when the support of the car is inside of the wheels. When the follower D is screwed as closely to the head $c$ of the axle as will allow it to turn in the wheel, I drill into the screw-joint of the wheel and follower, and insert a set-screw, $g$, to prevent the follower or nut D from being moved out of its place in backing the cars. The other wheel, E, I fasten firmly on the axle B in the ordinary manner, so that the only wear in the loose wheel shall be to make up the inequality of surface traveled by each wheel, and thus relieve all strain on the axle, except to carry the weight of the burden, and it will also save the extraordinary wear of the rails at curves.

As there is liability of wear by the sway of the cars sidewise, I make several seats, $i\,i\,i$, in the edge of the nut D for the set-screw $g$, and when the wheel requires tightening I take out the set-screw $g$ and turn forward the nut or follower until the next seat matches the one in the wheel, and secure it by the set-screw in like manner as often as required to be tightened.

For the purpose of putting on and tightening the loose wheel on the axle, I use a forked wrench having four prongs on one side, made so as to match and fit holes $j\,j\,j\,j$ in the follower D, by which means the wheel is kept firm in its bearing on the axle, and made to operate in the most satisfactory manner.

Having thus fully described my invention, what I claim as new, and desire to secure by Letters Patent, is—

The divided follower D, set-screw $g$, and head $c$ on axle B, in combination with the tight wheel E, in the manner and for the purposes hereinbefore set forth.

NELSON W. NORTHRUP.

Witnesses:
WM. FRANK BROWN,
R. F. OSGOOD.